United States Patent
Gong et al.

(10) Patent No.: US 9,493,047 B2
(45) Date of Patent: Nov. 15, 2016

(54) AMPHIBIOUS UNICYCLE

(71) Applicant: SHENZHEN ZHIYOU BATTERY INTEGRATION TECHNOLOGY CO., LTD, Shenzhen (CN)

(72) Inventors: Shugang Gong, Shenzhen (CN); Bo Fu, Shenzhen (CN); Lei Peng, Shenzhen (CN); Yiguo Xu, Shenzhen (CN); Yun Chen, Shenzhen (CN)

(73) Assignee: SHENZHEN ZHIYOU BATTERY INTEGRATION TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/907,203

(22) PCT Filed: Jul. 24, 2013

(86) PCT No.: PCT/CN2013/080043
§ 371 (c)(1),
(2) Date: Jan. 22, 2016

(87) PCT Pub. No.: WO2015/010288
PCT Pub. Date: Jan. 29, 2015

(65) Prior Publication Data
US 2016/0159179 A1  Jun. 9, 2016

(51) Int. Cl.
*B60F 3/00* (2006.01)
*B63H 5/02* (2006.01)
*B63H 5/07* (2006.01)

(52) U.S. Cl.
CPC .............. *B60F 3/0084* (2013.01); *B63H 5/02* (2013.01); *B63H 5/07* (2013.01)

(58) Field of Classification Search
IPC .... B63B 1/047; B60F 3/0084; B63H 5/02,5/07
See application file for complete search history.

(56) References Cited

U.S. PATENT DOCUMENTS 3,934,291 A * 1/1976 Hagen ................. B63H 1/38
440/100

FOREIGN PATENT DOCUMENTS

| CN | 101085594 | 12/2007 |
|---|---|---|
| CN | 101547802 | 9/2009 |
| CN | 102069691 | 5/2011 |
| FR | 2491399 | 4/1982 |
| WO | 2010/031093 | 3/2010 |

OTHER PUBLICATIONS

International Search Report of PCT/CN2013/080043, dated Apr. 24, 2014, and English translation thereof, 4 pages total.

* cited by examiner

*Primary Examiner* — Stephen Avila
(74) *Attorney, Agent, or Firm* — Hamre, Schumann, Mueller & Larson, P.C.

(57) ABSTRACT

An amphibious unicycle, comprising an annular casing having an accommodation cavity; two sides of the annular casing are respectively provided with openings communicating with the accommodation cavity; the openings are provided with doors for closing the openings; the doors are rotatably connected to the annular casing; the two sides of the annular casing are respectively provided with annularly arranged external rotor motors; the external rotors of the external rotor motors are provided with a plurality of drainage holes therein arranged along the circumference of the external rotors; the accommodation cavity is provided with a power system for driving the unicycle to operate.

19 Claims, 7 Drawing Sheets

AMPHIBIOUS UNICYCLE

FIELD OF THE APPLICATION

The application relates to the field of vehicle technology, especially to an amphibious unicycle.

BACKGROUND OF THE APPLICATION

With the development of technology, vehicles are more and more diversified, and structures of vehicles change accordingly.

In the prior art, the basic structures of vehicles still keep the multiple-wheel-drive mode. Furthermore, at present, the vehicles can only drive on flat lands. For vehicles which need to meet the requirements for driving in deserts or other special lands, additional reformations to the structures of the vehicle are required so as to adapt to different ground conditions. Furthermore, at present, only hydrogliders can drive on the surface of water; the hydrogliders are not driven by wheels to drive on the surface of water, but belong to one type of airplanes. Only submarines can dive in the water, and there is no vehicle capable of diving in the water now.

Above all, the vehicles in the prior art possess poor adaptability of driving conditions, and do not have the ability to drive underwater or on the water surface, that is, the vehicles in the prior art have no amphibious function.

SUMMARY OF THE APPLICATION

The application aims at providing an amphibious unicycle, and solving the problems that the vehicles in the prior art possess poor adaptability on driving conditions and have no amphibious function.

The invention is realized by an amphibious unicycle which comprises an annular casing having a accommodation cavity; two sides of the annular casing are respectively provided with two openings which are communicated with the accommodation cavity; doors are arranged at the openings for sealing the openings; the doors are rotatably connected with the annular casing; two sides of the annular casing are respectively provided with external rotor motors arranged annularly; the external rotors of the external rotor motors are provided with a plurality of drainage holes arranged around the periphery of the external rotors; the accommodation cavity is provided therein with a power system for driving the unicycle.

Compared with the prior art, the unicycle provided by the invention can form a enclosed structure comprising the door and the annular casing; owing to the external rotor motors at two sides of the annular casing and the external rotors, the unicycle can drive on lands including the desert, and even on the surface of water; the unicycle possesses great adaptability to driving conditions and amphibious effect.

DETAILED DESCRIPTION OF THE PREFERRED EMBODIMENT

The invention will be further described in detail accompanying with the embodiments and drawings in order to make the purpose, technical solutions and advantages of the invention more clear. It should be understood that the specific embodiments described herein are just for explanation and should not deemed as limitation to the invention.

The invention will be described in detail accompanying with the specific drawings.

Figure 1:
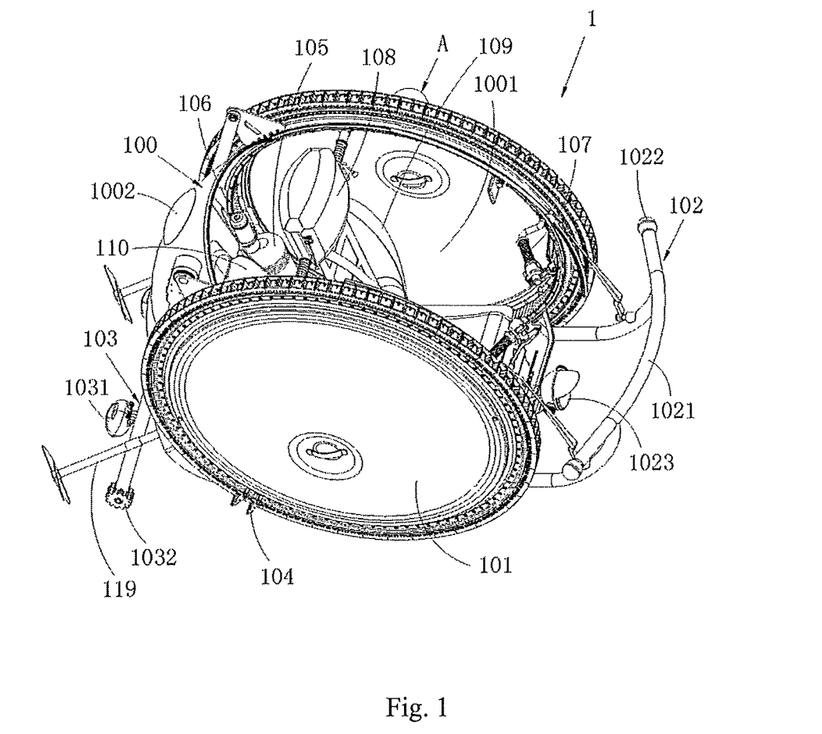
FIG. 1 is a perspective schematic view of an amphibious unicycle provided by an embodiment of the invention.
Figure 2:
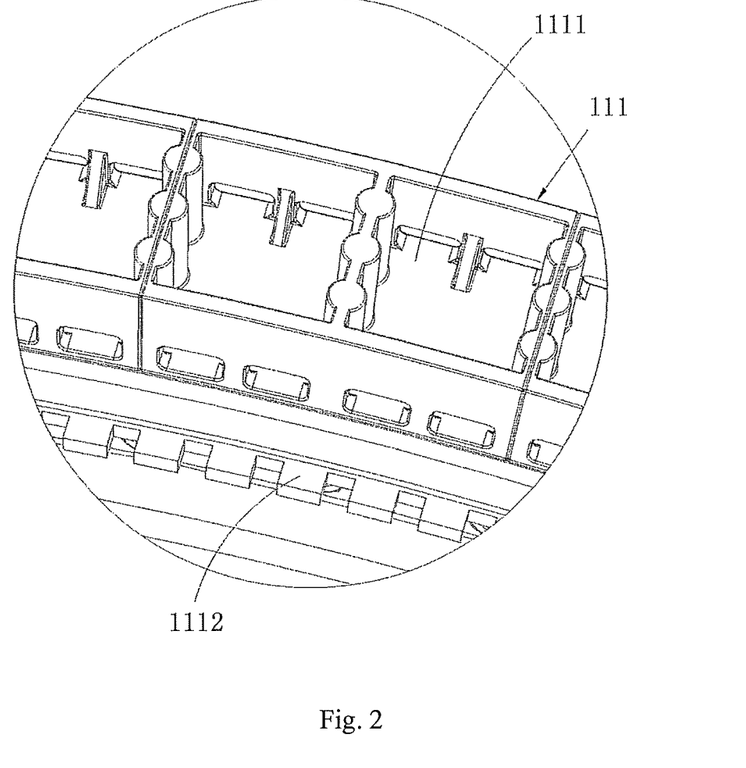
FIG. 2 is an enlarged schematic view of the part A of FIG. 1.
Figure 3:
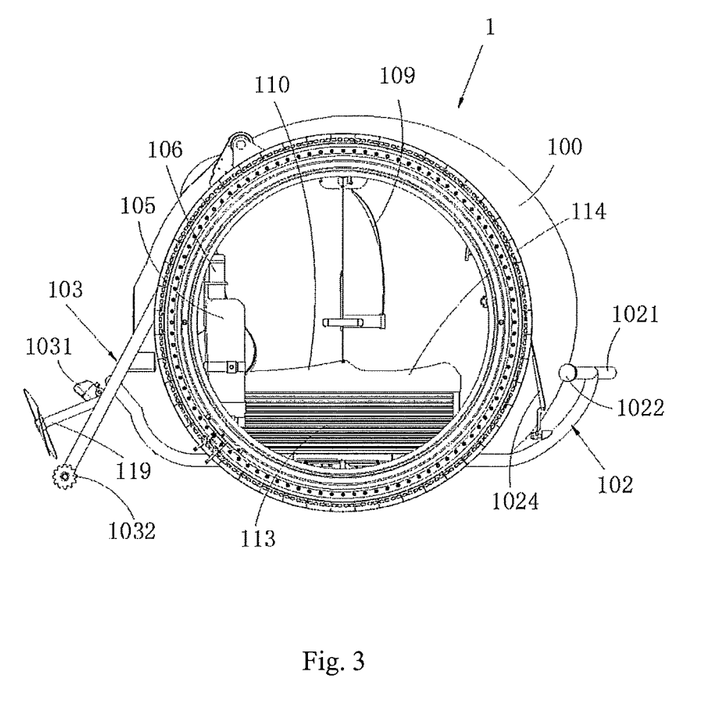
FIG. 3 is a left schematic view of an amphibious unicycle provided by an embodiment of the invention.
Figure 4:
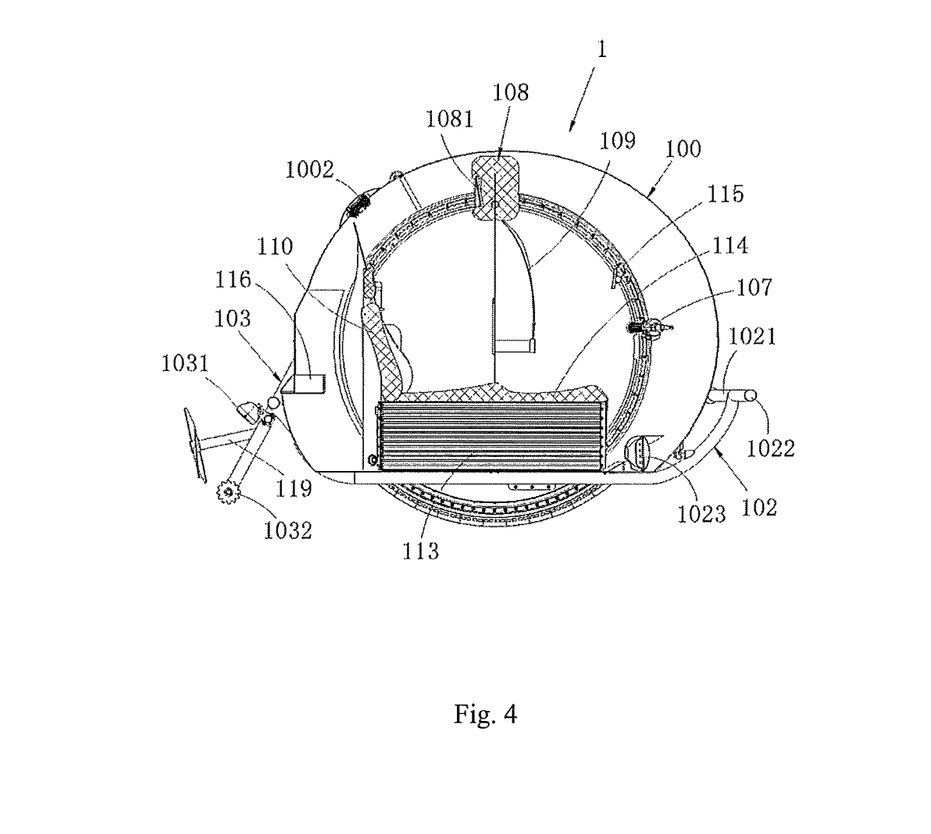
FIG. 4 is a sectional schematic view of an amphibious unicycle provided by an embodiment of the invention.
Figure 5:
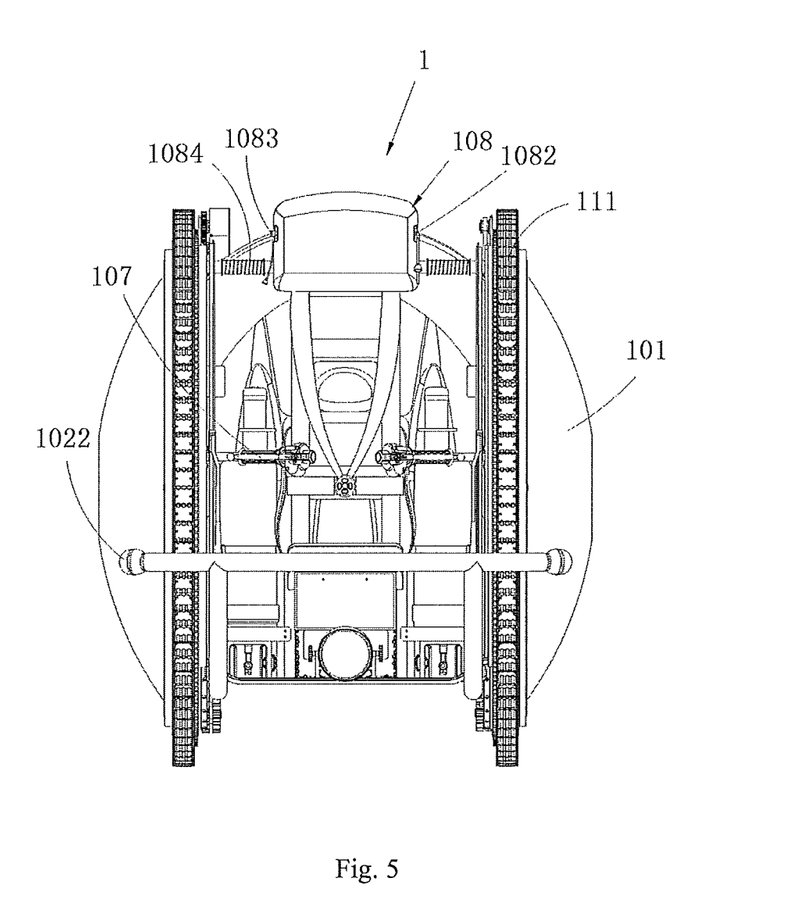
FIG. 5 is a front schematic view of an amphibious unicycle provided by an embodiment of the invention.
Figure 6:
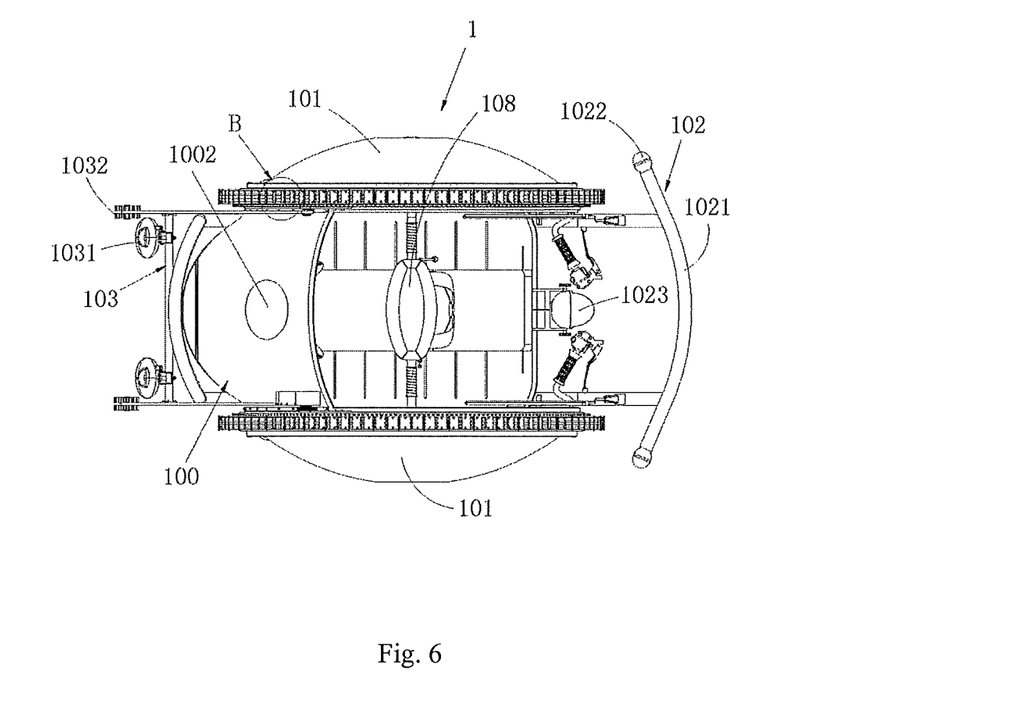
FIG. 6 is a top schematic view of an amphibious unicycle provided by an embodiment of the invention.
Figure 7:
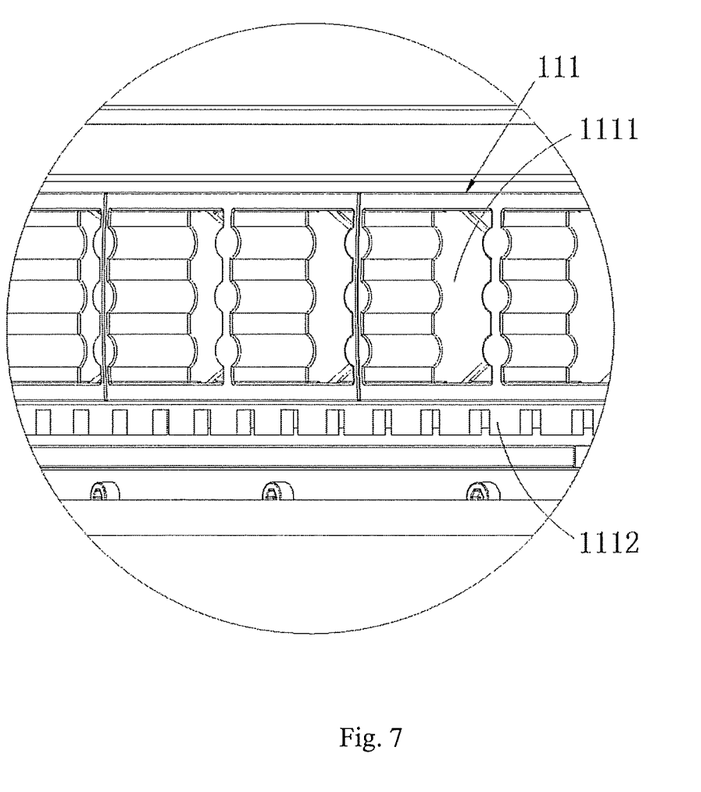
FIG. 7 is an enlarged schematic view of the part B of FIG. 6.

As shown in FIGS. 1-7, a preferred embodiment of the invention is provided.

The embodiment provides an amphibious unicycle 1, which comprises an annular casing 100; the annular casing 100 is provided with an accommodation cavity 1001. Two openings are arranged on the two sides of the annular casing 100 respectively; the two openings are communicated with the accommodation cavity 1001. Doors 101 are hermetically arranged on the openings on two sides of the annular casings 100. The doors 101 are rotatably connected to the annular casing 100. When the doors 101 are closed, the doors 101 seal the accommodation cavity 1001; when the doors 101 are opened, the accommodation cavity 1001 is in an opening state.

To be sure, in other embodiments, the annular casing 100 can also be provided with an opening on one side thereof, therefore, it is possible to provide only one aforesaid door 101. Alternatively, the opening can also be arranged on other positions of the annular casing 100 such as the upper end or the lower end. Therefore, when the door 101 is arranged on the opening, the door 101 can also seal the accommodation cavity 1001 of the annular casing 100.

Alternatively, the annular casing 100 can be set into other shapes such as square or other different shapes, which is not limited by this embodiment, as long as the annular casing 100 is a casing having the accommodation cavity 1001, and provided with the opening; the opening is provided with a door 101 which can seal the accommodation cavity 1001, and the door 101 is rotatably connected with the casing.

In the embodiment, two sides of the annular casing 100 are provided with external rotor motors respectively; the external rotor motors comprise external rotors 111 which are arranged vertically along both sides of the annular casing 100; furthermore, the external rotors 111 are provided with a plurality of drainage holes 1111 distributed around the peripheries of the external rotors 111.

The two sides of annular casing 100 is further provided with drive gear structures 1112 arranged annularly and propellers 119; the propellers 119 are driven by the drive gear structures 1112 to rotate. The drive gear structures 1112 are arranged on the inner sides of the external rotors 111, and the propellers 119 are extended beyond the annular casing 100.

Specifically, each of the above mentioned drive gear structures 1112 comprises gears arranged around the inner sides of the external rotors 111 and a rotor for driving the rotation. To be sure, the power element for driving the rotation of gears can also be an air cylinder. In the embodiment, the gears are propeller gears; surely, the gears can also be gears of other structures. The propeller 119 comprises a propeller stem; a gearhead is arranged at the upper end of the propeller stem, and the gearhead is configured to engage with the gears of the drive gear structure 1112. A plurality of paddles are arranged at the lower end of the propeller stem, and the plurality of paddles are distributed annularly. The gearhead of the propeller 119 of the drive gear structure 1112 rotates so as to rotate the propeller stem, and further drive the plurality of paddles to rotate, thereby providing power to drive the unicycle 1 forward.

Hence, the above mentioned two external rotors 111 in combination of the annular casing 100 constitute a structure of a single-wheel shape.

The accommodation cavity 1001 of the above mentioned annular casing 100 is further provided therein with a power system 113, which is configured to drive the whole unicycle 1 to run and provide power. For example, the power system 113 is electrically connected with the above mentioned drive gear structures 1112. Therefore, the power system 113 drives the motors to run, thereby making the gears drive the external rotors 111 work, and enable the unicycle 1 to run.

The unicycle 1 provided by the embodiment can drive on lands using the external rotors 111 arranged on two sides of the annular casing 100. The annular casing 100 and the doors 101 can form an enclosed structure, which means that the doors 101 seals the openings of the annular casing 100 so as to make the accommodation cavity 1001 be enclosed. Therefore, through the enclosed structure constituted by the annular casing 100 and the doors 101, and the drainage holes 1111 of the external rotors 111, which function as propellers during running, water can be pushed so that the unicycle 1 can drive on the surface of water. Furthermore, the unicycle 1 can dive into water by adjusting the weight of the unicycle 1 and keeping the unicycle 1 in the enclosed state; the drive gear structures 1112 drive the propellers 119 to rotate, thereby driving the unicycle 1 to travel in the water. Furthermore, owing to the structure of the drainage holes 1111 of the external rotors 111, the unicycle 1 can also drive in the desert. The drainage holes 1111 makes the unicycle 1 drive in the desert fast by pushing the sand, and in the driving process, the sand can be discharged through the drainage holes 1111. Therefore, the unicycle 1 provided by the embodiment possesses the functions of driving on flat lands, in the desert, on the surface of water and into the water, thereby achieving great adaptability on drive conditions and amphibious effect.

In the embodiment, the lower end of the annular casing 100 is flat and has relatively large spacing with the lower ends of the external rotors 111 so as to protect the lower end of the unicycle 1 from colliding with the land during driving, meanwhile, the unicycle 1 is enabled to adapt to rugged lands. The upper end, front end, and rear end of the annular casing 100 are protruded and extended beyond the external rotors 111. Therefore, the dimension of the accommodation cavity 1001 of the annular casing 100 is increased greatly, and the accommodation of the unicycle 1 is bigger and has larger space.

The external rotors 111 are provided with a brake 104, by which the external rotors 111 are braked, thereby decelerating or stopping the unicycle 1, or keeping the unicycle 1 in stop state.

The periphery of each of the external rotors 111 is provided with an elastic ring which can protect the external rotors 111.

In the embodiment, each opening of the annular casing 100 is round; the opening can be other shapes for sure. The periphery of each door 101 is provided with sealing glue, which renders better connection and a higher sealing degree between the door 101 and the sidewall of the opening of the annular casing 100. Furthermore, both the inner side and the external side of each door 101 are provided with locks; the locks can lock the door 101 with the annular casing 100 together so as to protect the door 101 from opening when the unicycle 1 is driving, thereby ensuring the safety of the driver.

In order to enable the door 101 open and close relative to the annular casing 100, the accommodation cavity 1001 of the annular casing 100 is provided therein with an extendable stick; two ends of the extendable stick extend toward the openings of the annular casing 100 and are connected to an inner side of the door 101 respectively. The door 101 is connected with the annular casing 100 through a spindle; therefore, the door 101 can rotate relative to the annular casing 100. The extendable stick is arranged to be deviated from the spindle; therefore, owing to the concertina movement of the extendable stick, the door 101 can rotate relative to the annular casing 100, thereby realizing the effect of opening or closing the accommodation cavity 1001.

To be sure, the extendable stick can be omitted, and then the door 101 can be rotated manually so as to open or close the accommodation cavity 1001.

The lower end of above mentioned annular casing 100 is further provided with a protruding support 102 which is connected to the lower end of the annular casing 100, extended forward, and then bent upward to form a bumper 1021. The bumper 1021 is arranged in front of the annular casing 100, and two sides of the bumper 1021 are provided with turn lights 1022 respectively. When the unicycle 1 needs to be rotated, the turn lights 1022 can be operated directly for safe drive, and the turn lights 1022 possess the effect of front lighting.

The bumper 1021 is provided with a sprayer structure and a wiper blade 1024. The bumper 1021 can spray towards the annular casing 100. The wiper blade 1024 can wipe the surface of the annular casing 100 so as to wipe out the dust, rainwater or others on the annular casing 100.

Furthermore, two sides of the front end of the annular casing 100 are respectively provided with rearview mirrors 115 with feature navigation function. Therefore, the rearview mirrors 115 can not only function as rearview mirrors when the unicycle 1 is driving, but also function as navigation elements.

In the embodiment, the annular casing 100 is provided with at least one venthole 1002 with open-close function. The venthole 1002 is communicated with the accommodation cavity 1001 of the annular casing 100. Therefore, when the unicycle 1 does not drive underwater, the venthole 1002 can be opened to communicate the accommodation cavity 1001 with exterior for ventilating. When the unicycle 1 drives underwater, the venthole 1002 should be closed to seal the accommodation cavity 1001 of the annular casing 100.

The annular casing 100 is further provided with a strip-shape support 103. The upper end of the support 103 is rotatably connected to the annular casing 100; therefore, the support 103 can wiggle relative to the annular casing 100 so as to abut the lower end of the support 103 against the ground. Therefore, staff such as the driver can reach the roof of the annular casing 100 through the support 103 to maintain and operate or implement other operations.

The lower end of the support 103 is provided with an anti-skid wheel 1032. When the lower end of the support 103 is abutted against the ground, the anti-skid wheel 1032 can prevent the lower end of the support 103 from skidding so as to ensure the safety of the staff. To be sure, the lower end of the support 103 can be provided with other anti-skid mechanisms that are not limited to the anti-skid wheel 1032, such as anti-skid mat.

The above mentioned support 103 is further provided with a fog-proof light 1031 which is arranged towards opposite to the surface of the annular casing 100. Therefore, if there is frog in front when the unicycle 1 is driving, the frog-proof light 1031 can be turned on to ensure the safety of the driving unicycle 1.

The propeller stem of the propeller 119 is connected with the support 103, therefore, when the unicycle 1 needs to dive into the water, the support 103 can be wiggled to an appropriate position. The gearhead of the propeller 119 will engage with the drive gear structure 1112. The plurality of paddles of the propeller stem will extend outwards the annular casing 100, and the drive gear structure 1112 drives the propeller 119 to rotate.

The accommodation cavity 1001 of the annular casing 100 is provided with a first seat 110 inside the accommodation cavity 1001 so that the driver can sit in the unicycle 1 during driving. The first seat 110 features the back door function, and a side of the first seat 110 is provided with a door handle 107 for controlling the opening or closing of the door 101.

In the embodiment, the first seat 110 can be a back-rest chair which can support the back or other types of chairs for sure. Both sides of the first seat 110 are provided with handrails for the driver to hold when he/she stands up.

A second seat 114 is arranged in front of the first seat 110; the second seat 114 and the first seat 110 are arranged to space from each other, therefore, the accommodation cavity 1001 of the annular casing 100 can accommodate two persons. The second seat 114 is provided with a safety belt 109, and a headrest 108 is arranged at the upper end of the second seat 114. An intercommunication device 1083 is embedded in the headrest 108, which can ensure that the driver can communicate with the exterior.

Furthermore, the headrest 108 is further provided with a reading lamp 1082. When the reading lamp 1082 is turned on, the driver can read, write, or implement other operations in the accommodation cavity 1001. In the embodiment, the end surface of the second seat 114 towards the first seat 110 is provided with a bag for books and newspaper. A plurality of magazines, notebooks or others can be placed in the bag for the driver to read, take notes, or perform implement other operations.

In the embodiment, the power system 113 is a power battery which is located under the first seat 110 and the second seat 114. To be sure, the power system 113 can be in other types, and should not be restricted to the power battery of the embodiment.

The accommodation cavity 1001 is further provided therein with an oxygen bottle 105. When the accommodation cavity 1001 is in the sealing state, the oxygen bottle 105 can provide oxygen to the driver for breath so as to ensure the safety of the driver.

The oxygen bottle 105 can be located at many locations. In the embodiment, the oxygen bottle 105 is located at the backside of the first seat 110.

The backside of the first seat 110 is further provided with a cup holder 106 configured to hold cup or others for daily drinking of the driver. To be sure, the cup holder 106 can be arranged at other locations according to actual requirements.

The accommodation cavity 1001 of the annular casing 100 is provided therein with a heat pump air conditioner with open-close function; correspondingly, the annular casing 100 is provided with an exhaust vent. Therefore, when the heat pump air conditioner is working, air can be exhausted through the exhaust vent.

Additionally, an inlet vent is arranged at the lower end of the annular casing 100. When the heat pump air conditioner is working, the inlet vent cooperates with the exhaust vent to realize the entrance and discharge of air.

In order to realize illumination in the accommodation cavity 1001 of the annular casing 100, the accommodation cavity 1001 is further provided with a headlight 1031 and a tail light 116. The headlight 1031 can be located in front of the accommodation cavity 1001 or outside of the accommodation cavity 1001, i.e., at the protruding support 12 for sure. The rear light 116 is located in the rear of the accommodation cavity 1001.

A clamping piece 108 is arranged at the end surface of the headrest 108 towards the first seat 110, and the clamping piece 108 is used to clamp common devices such as a computer.

In order to put common tools or some necessary stuff in the accommodation cavity 1001, the accommodation cavity 1001 is provided with a trunk which is located behind the first seat 110.

The amphibious unicycle 1 provided by the embodiment is a pure electromobile based on a motor with multipolar-distributed-drive switch reluctance external rotor 111. The amphibious unicycle 1 can drive in deserts and on other lands, navigate on the surface of water, and underwater up to 2 meters when equipped with a dive bag. Its highest speed record on the land can reach 100 km/h holding 2 persons. The dead weight of the amphibious unicycle 1 can be 350 Kg, and full load thereof can be 500 Kg; if a 18.6 KWH battery package thereof is fully charged, the amphibious unicycle 1 can travel about 600 Km. The amphibious unicycle 1 is applicable widely to urban traffic, regional transport, military landing, tourist site stroll, field observation, and implementations of business and mission.

The above contents are just preferred embodiments of the invention, and should not be deemed as limitation to the invention. Any modifications, equivalences and improvements made within the spirit and principle of the invention should be included in the protection scope of the invention.

What is claimed is:
1. An amphibious unicycle, comprising:
an annular casing enclosing an accommodation cavity;
two openings disposed at two sides of the annular casing respectively;
doors rotatably connected to the annular casing, each of the doors closes and seals the respective opening; and
external rotor motors annularly provided at two sides of the annular casing respectively,
wherein the external rotor motors comprise external rotors, each of the external rotors being arranged vertically along a respective side of the annular casing, each of the external rotors being provided with a plurality of drainage holes arranged around a periphery thereof,
wherein the accommodation cavity is configured to include a power system that drives the amphibious unicycle therein,
wherein each of the two sides Of the annular casing includes a drive gear structure arranged annularly and a propeller configured to be driven by the drive gear structure,
wherein the drive gear structure is disposed on inner sides of the external rotors, and
wherein the propeller extends outside the annular casing.

2. The amphibious unicycle of claim 1, wherein a lower end of the annular casing is flat and arranged above bottoms of the external rotors, and an upper end, a front end, and a rear end of the annular casing are protruded and extended beyond the external rotors.

3. The amphibious unicycle of claim 1, wherein a periphery of each of the external rotors is provided with an elastic ring.

4. The amphibious unicycle of claim 1, wherein the accommodation cavity is provided therein with an extendable stick, two ends of the extendable stick extend towards two openings respectively and connect to the door, the door is rotatably connected with the annular casing through a spindle, and the extendable stick deviates from the spindle.

5. The amphibious unicycle of claim 1, wherein a lower end of the annular casing is provided with a protruding support which is extended forward and bent upward to form a bumper in front of the annular casing, and the bumper is provided with turn lights on two sides of the bumper respectively.

6. The amphibious unicycle of claim 1, wherein the annular casing is provided with a strip-shaped support which wiggles around an axis of the annular casing, an upper end of the strip-shaped support is rotatably connected to the annular casing, and a lower end of the strip-shaped support is provided with an anti-skid wheel.

7. The amphibious unicycle of claim 6, wherein the propeller comprises a propeller stem;

a middle part of the propeller stem is connected with the strip-shaped support, a gearhead is arranged at an upper end of the propeller stem, and configured to engage with the drive gear structure, and a plurality of paddles are arranged at a lower end of the propeller stem, and distributed annularly.

8. The amphibious unicycle of claim 1, wherein the accommodation cavity is provided therein with a first seat and a second seat, the second seat is arranged in front of the first seat, the power system is arranged under the first seat and the second seat, the second seat is provided with a safety belt and a headrest, and an intercommunication device and a reading light are embedded in on two sides of the headrest respectively.

9. The amphibious unicycle of claim 8, wherein two sides of the first seat are provided with handrails respectively.

10. The amphibious unicycle of claim 1, wherein the accommodation cavity is provided therein with a headlight and a tail light respectively, the headlight is arranged in front of the accommodation cavity, and the rear light is arranged in rear of the accommodation cavity.

11. The amphibious unicycle of claim 8, wherein a clamping piece is arranged at an end surface of the headrest towards the first seat.

12. The amphibious unicycle of claim 1, wherein the external rotors are provided with a brake by which the external rotors can be braked.

13. The amphibious unicycle of claim 5, wherein the bumper is provided with a sprayer structure and a wiper blade.

14. The amphibious unicycle of claim 1, wherein the annular casing is provided with at least one venthole with open-close function.

15. The amphibious unicycle of claim 6, wherein the support is further provided with a fog-proof light which is arranged oppositely with respect to a surface of the annular casing.

16. The amphibious unicycle of claim 8, wherein an end surface of the second seat towards the first seat is provided with a bag for books and newspaper.

17. The amphibious unicycle of claim 1, wherein the accommodation cavity is further provided therein with an oxygen bottle.

18. The amphibious unicycle of claim 1, wherein the accommodation cavity is further provided therein with a heat pump air conditioner with open-close function, the annular casing is provided therein with an exhaust vent, and the lower end of the annular casing is provided with an inlet vent correspondingly.

19. The amphibious unicycle of claim 5, wherein the accommodation cavity is further provided with a headlight and a tail light, the headlight is located at the protruding support, and the tail light is located in the rear of the accommodation cavity.

* * * * *